May 20, 1969

I. BROWNING 3,445,164

PORTABLE COPY MACHINE

Filed Feb. 6, 1967

INVENTOR.
IBEN BROWNING

BY *Townsend and Townsend*

ATTORNEYS

INVENTOR.
IBEN BROWNING
BY
ATTORNEYS

United States Patent Office 3,445,164
Patented May 20, 1969

3,445,164
PORTABLE COPY MACHINE
Iben Browning, Sunnyvale, Calif.
(1052 Pomeroy Ave., Santa Clara, Calif. 95051)
Continuation-in-part of application Ser. No. 551,274, May 19, 1966. This application Feb. 6, 1967, Ser. No. 614,118
Int. Cl. G03b 27/04
U.S. Cl. 355—82
8 Claims

ABSTRACT OF THE DISCLOSURE

A platen for producing a photocopy using ambient light and including a rigid member having a surface of a size at least coextensive with the copy paper, a light-sensitive element connected to the rigid member adjacent the region of the copy paper and an indicating light connected to the member and exposed to the view of the operator. The rigid member can serve as a platform on which the copy paper is laid or take the form of a transparent member placed upon the paper being copied and in which internal light reflections are conducted to the light-sensitive element.

---

This application is a continuation-in-part of application Ser. No. 364,128 filed May 1, 1964, now Patent No. 3,262,334, entitled Portable Copy Machine and application Ser. No. 551,274 filed May 19, 1966 entitled Copying Method and Apparatus.

This invention relates in general to a portable photocopying platen and more particularly to a device which can be utilized without the necessity of an external power supply conveniently in libraries for producing copies of various documents.

Broadly stated the present invention is directed to a portable photocopying platform including a substantially rigid member having a surface of a size at least coextensive with the copy paper and a light integrating circuit connected to the rigid member for integrating an electrical analog proportional to the amount of ambient light incident on said surface until a desired amount of light necessary to produce the proper exposure of the copy paper has been received on the surface. The circuit includes a photosensitive element adjacent the copy paper to receive ambient light the output of which is an electrical analog of the ambient light incident on the surface and an indicating means connected to said member and exposed to the view of the operator for producing a signal when the desired amount of light has been received.

In the past, a number of photocopy machines have been introduced on the market, some of which utilize a dry developing process and some utilizing a wet developing process. The construction of these machines has varied depending upon the type of work to be performed with the machine. For example, in copying letters or other information contained on only one side of a semi-transparent, regulation size sheet, the machine can be constructed so that light is projected through the sheet to be copied onto the photosensitive copy paper. This can be conveniently done by utilizing rollers which drive the paper to be copied in contact with the photosensitive copy paper around or past a light source at a given speed, the speed being adjustable to vary the exposure of light on the photocopy paper. Where a regulation size sheet of paper is printed on both sides, transilluminated photosensitive copy paper can be used in contact with the side of the paper to be copied and the light projected through the copy paper.

Disadvantages of these copying machines lie in the fact that, unless transilluminated copy paper is used, variations in the transparency of the sheet to be copied must be accounted for by variations in the exposure time, and that these machines cannot be used to copy large works such as maps, graphs, charts, etc., or material contained in books. Therefore, it has been customary to provide, either as an accessory for the printing part of the type of machines described above or as the primary exposure means for the copying machine, a separate book copying illuminator with a transparent copying platform through which light is directed from an internal light source and with a clock timer to measure exposure time. Typically with these machines, transilluminated photosensitive copy paper is utilized, and the photopositive is produced in an associated or independent printing assembly. The major disadvantage of this type of machine lies in the fact that it is quite bulky due to the light sources provided therein and usually requires connection to an electrical outlet.

The apparatus in accordance with the present invention avoids these drawbacks in prior art copying machines in that a platform is provided on which large materials such as charts, maps, etc., or books can be placed for copying. Normal ambient illumination is utilized to produce the exposure of the photosensitive copy paper, thereby avoiding the necessity for connection to a power source. This is extremely advantageous for use in libraries where often it is necessary to make copies from a number of different volumes which it is impossible or impractical to remove from the premises. While some libraries have copying facilities, it is much more convenient to be able to make the desired copy as soon as the matter to be copied is located rather than proceeding with the time-consuming process of arranging for copies to be made by the library. Additionally, most libraries do not permit private electrical machines to be plugged into their electrical system.

An additional advantage of the present invention lies in the fact that the light-integrating circuit utilized to measure the exposure time for making the photocopy measures light corresponding to the integrated light incident on the photocopy paper to that changes of intensity that may occur during the copying process do not effect a change in the exposure of the photosensitive copy paper. Thus the photocopy that is produced by the copying machine is dependent upon the total amount of light received during the exposure.

In one embodiment of the present invention the portable photocopying machine includes a casing having a top surface serving as a copying platform and a light-integrating circuit including a photosensitive element exposed to ambient light at the casing surface to receive ambient light that corresponds to the ambient light incident on the top surface, and an indicator mounted on the platform and exposed to the operator for producing a signal when the desired amount of light has been received. The casing can include light-tight compartments to hold exposed and unexposed photocopy paper or the paper can be transported in separate light-tight envelopes.

Photosensitive copy paper that has been exposed on the copying platform can be used at any time to produce the desired photocopy of the printed material in the printing apparatus so long as the exposed photosensitive paper is kept in the light-tight container provided therefor in the interim.

In accordance with another aspect of the present invention, a transparent timing platen is provided for placement on the portion of the graphic material to be copied and a photosensitive element is located within the platen to detect the amount of light internally reflected within the platen, which light is proportional to the ambient illumination directed through the platen onto the copy paper therebelow. This construction permits placement of the platen on small as well as large objects to be copied and also serves to flatten the sheet being copied while giving an accurate representation of the amount of light actually incident on the photosensitive sheet.

In accordance with another aspect of the present invention, an opaque flap is provided on the surface of the timing platen for permitting positioning of the timing platen and photosensitive paper on the article to be copied and removal of the opaque flap to serve as initiation of the timing cycle during which the sensitized paper is exposed to ambient illumination. In accordance with this aspect of the present invention, the opaque flap is provided with means cooperating with the timing circuit to initiate the timing cycle.

Another aspect of the present invention is the provision of a magnetic switch secured to the platen of the last aforementioned aspect for initiating the timing cycle and the location of a magnet on the opaque flap to operate the switch when the opaque flap is lifted from the platen. Thus, with this construction, removal of the opaque flap from the timing platen effectively closes the circuit in the timing cycle to measure the ambient illumination on the photosensitve paper by providing an electrical analog thereof.

One embodiment of the light integrating timer includes a battery, a light-sensitive resistor connected to the battery and exposed to the ambient light to provide an electrical analog of the ambient light incident upon the paper being copied, a lamp, a charging capacitor connected across the lamp and a switch for connecting the lamp and capacitor in circuit with the battery and resistor for charging the capacitor and igniting the lamp in a time interval dependent upon the amount of ambient light incident upon the light sensitive resistor during an extended period of time.

Preferably, the switch provides for shunting of the capacitor during non-use so that the circuit is ready for use when the capacitor and lamp are connected with the battery.

This circuit is extremely compact for incorporation in the portable copying machine to provide a copying machine that can be used inconspicuously and without disturbing others.

As an additional feature of the present invention the timer circuit can be variable either by providing a variable resistor in the circuit or varying the input to the light-sensitive resistor to permit adjustment of the timing circuit for copy papers having different sensitivities.

Other objects of the present invention will become apparent upon reading the following specification and referring to the accompanying drawings in which similar characters of reference represent corresponding parts in each of the several views.

Figure 1:
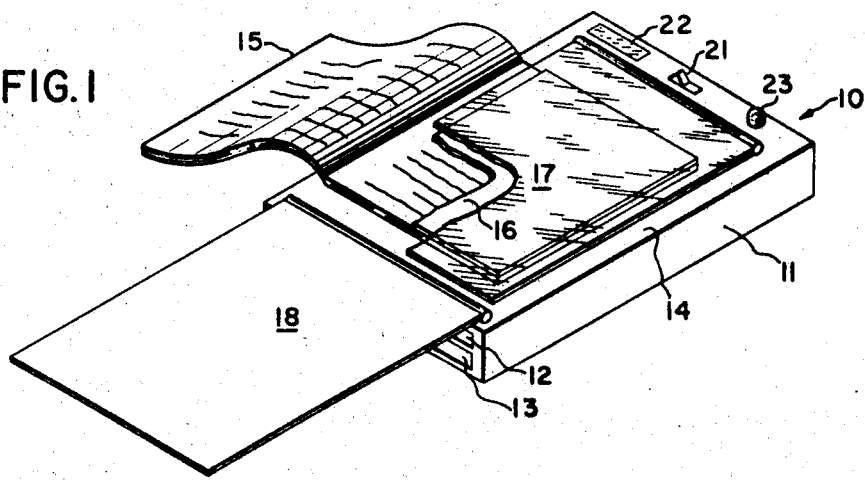
FIG. 1 is a perspective view, partially broken away, of a portable copy machine embodying the present invention.

Referring now to the drawing, there is shown in FIG. 1 a portable photocopy machine 10 embodying the present invention and including a casing 11 which is in the form of a shallow rectangular container and which is provided with light-tight compartments 12 and 13 for unexposed and exposed photosensitive copy paper. These compartments 12 and 13 are provided with hinged doors for easy access to the photosensitive paper.

The top surface 14 of the casing 11 serves as the copying platform for the material to be copied which, as illustrated in FIG. 1, is a page of a book 15. Also mounted on the surface or copying platform 14 is a transparent cover 17 such as, for example, clear plastic, which is sufficiently heavy to hold a piece of copy paper 16 in place on the book 15 being copied but clear enough for permitting ambient light to fall on the copy paper 16 substantially unattenuated. The transparent cover 17 is preferably flexible enough to fold over the edges of the book and take the shape of the copy paper. Also mounted on top of the copying platform 14 is a non-transparent cover 18 such as, for example, black cloth, which can be folded over the photosensitive copy paper until it is desired to initiate an exposure.

Mounted within the casing 11 is a light-integrating timer 20 which includes on the copying platform a switch 21, the light input for a light-sensitive resistor 22 and a lamp 23 such as, for example, a neon light, for indicating completion of the desired exposure period. While in the preferred embodiment of the present invention as illustrated in FIG. 1, switch 21, light input for resistor 22 and light 23 are all mounted at one end of the copying platform 14, only the light input for the light-sensitive resistor 22 need be exposed on the copying platform so long as the light 23 is exposed to the operator.

Figure 2:
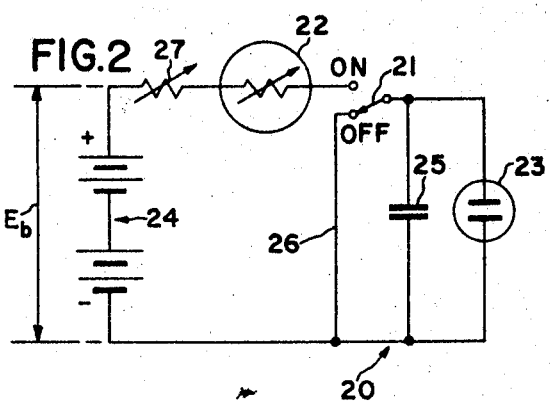
FIG. 2 is a circuit diagram showing an integrating timer circuit utilized in the photocopy machine.

Referring now to FIG. 2, there is shown the circuit diagram of one light-integrating timer 20. This circuit includes a battery 24, one end of which is series connected through the light-sensitive resistor 22 to one of the fixed contacts (On) of the double throw switch 21. The movable pole of the switch 21 is connected by a line through the light 23 to the other terminal of the battery 24. Shuttered across the light 23 is a charge capacitor 25 and the other contact (Off) of the switch 21 is connected via a line 26 to the battery return. A variable resistor 27 can be provided in the battery circuit for adjusting the circuit resistance for papers of different sensitivity.

Figure 3:
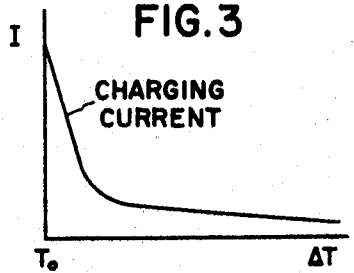
FIG. 3 is a graph of current versus time for the circuit shown in FIG. 2.
Figure 4:
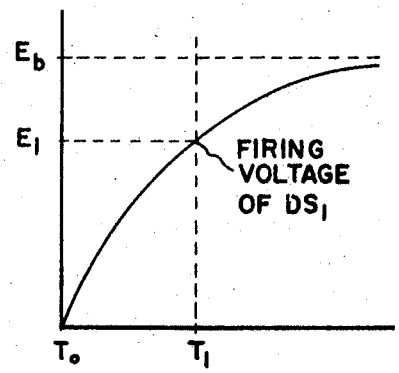
FIG. 4 is a graph of expected voltage versus time for charging the circuit of FIG. 2.
Figure 5:
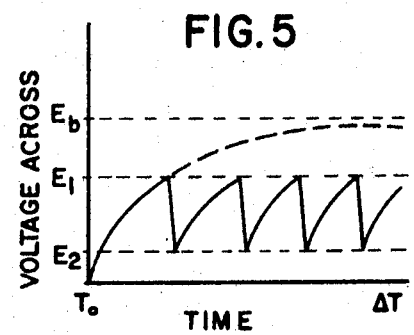
FIG. 5 is a graph of voltage across the capacitor in the circuit of FIG. 2 versus time.

By throwing the switch 21 to the "On" position, the light-sensitive resistor 22 is connected in a timing circuit with the light 23, the battery 24 and the capacitor 25 to produce an initial transient current as shown in FIG. 3 and initially the I.R. drop across the light-sensitive resistor is equal to the battery voltage $E_b$. This charge is gradually transferred to the capacitor 25 as shown in FIG. 4 until the breakdown voltage $E_1$ of the lamp is reached. At this point, the charge on the capacitor causes ignition of the lamp and discharge through the lamp until the voltage across the lamp reaches a level $E_2$ as shown in FIG. 5 and is no longer able to sustain ignition. The cycle then repeats itself as shown in FIG. 5, until the switch 21 is thrown from the "On" to the "Off" position.

The copying machine is used in the following manner. The book 15 is placed on the copying platform 14 with the page to be copied facing upwardly for reception of ambient light, either overhead light or scattered sun or artificial light whichever the case may be. A sheet of copy paper 16 is removed from the unexposed paper compartment 12 and placed with the negative side down on top of the page of the book 15. In order to hold the copy paper in place, the transparent cover 17 is folded over the copy paper and, if desired, the non-transparent cover 18 folded over the transparent cover 17. As soon as it is desired to begin the exposure, switch 21 is thrown from the "Off" to the "On" position and the non-transparent cover 18 removed from the cover 17. The resistance of the light-sensitive resistor 22 which is dependent upon the light incident on the copying platform 14 permits current to flow to the capacitor 25 such that, when the copy paper 16 has been exposed to sufficient light to sensitize the photocopy paper, the light 23 fires to indicate the end of the exposure time. The exposed copy paper 16 is then placed in the exposed paper compartment 13 for retention until it can be conveniently processed in the portion of the machine which produces the final copy. The switch 21 is flipped to "Off" position to disconnect the battery and at the same time discharge the capacitor 25 so that the circuit is ready for the next timing cycle.

By way of example, the photocopying apparatus in accordance with the present invention can be utilized with commercially available transilluminated photosensitive copy paper such as, for example, Apeco photonegative copy paper sold for use in Apeco Auto Stat copy machines by American Photocopy Equipment Company, or Transcopy copy paper sold by Transcopy, Inc.

By way of example, the Apeco copy paper has an exposure index of approximately 50 and the exposure time for producing a photonegative with the copy apparatus according to the present invention may be satisfactorily calculated by the formula $50/I=t$ where I is the light intensity in foot candles and $t$ is the exposure time in seconds. In the practice of the present invention, light intensity readings taken with a light meter in a library have disclosed an intensity of 2.5, which yields an exposure time of 20 seconds.

A circuit as shown in FIGURE 2 has been constructed using for the elements of the circuit the following commercially available items:

| Ref. No. | Name description | Manufacturing name | Type No. |
|---|---|---|---|
| 21 | Switch | Hamlin | DRG-DTH |
| 22 | Resistor | Amperex | ORP-60 |
| 23 | Neon lamp | Sylvania | NE-2 |
| 24 | Batteries (2) | R.C.A. | U 30 |
| 25 | Capacitor | Mallory | 11 |

The Amperex light-sensitive resistor has a dark resistance of the order of 200 megohms, and by enclosing the resistor in a dark container and adjusting the amount of light allowed to leak to it, a direct correspondence of resistance for light reading may be obtained as illustrated in the following table:

| Light meter readings (foot candles) | Exposure time (seconds) | Resistance (megohms) |
|---|---|---|
| .5 | 100 | 100 |
| 1.0 | 50 | 50 |
| 1.5 | 33.3 | 33.3 |
| 2.0 | 25 | 25 |
| 2.5 | 20 | 20 |
| 3.0 | 16.6 | 16.6 |

The input end of the container in which the resistor is positioned can be provided with a sliding cover for adjusting the amount of light leaking to the resistor or the resistor 27 can be varied to adjust the integrating timer circiut when paper of a different exposure index is used.

In practicing the present invention with the circuit and commercial elements described above, the charging current of the circuit is so low that it can be considered a no greater drain on the batteries than the normal shelf life of these elements.

Figure 6:
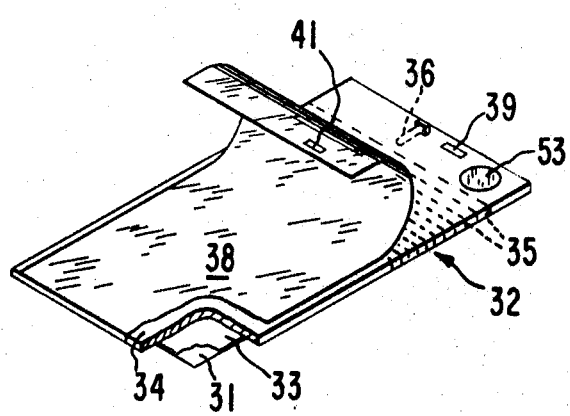
FIG. 6 is a perspective view of a portable copying platen embodying another aspect of the present invention.
Figure 7:
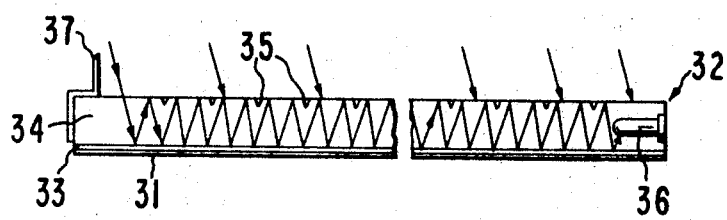
FIG. 7 is an enlarged foreshortened side view of the timing platen shown in FIG. 6.

In the embodiment of the invention shown in FIGS. 6 and 7 for copying graphic information contained on a sheet 31 the copying device includes a timing platen 32 shown in accordance with one aspect of the present invention as a separate entity that can easily be placed upon the material to be copied. The platen can contain all of the necessary operable elements of the invention for exposing the photocopy paper 33 or can be movably connected via a cable to a device (not shown) where the development is accomplished.

Figure 8:
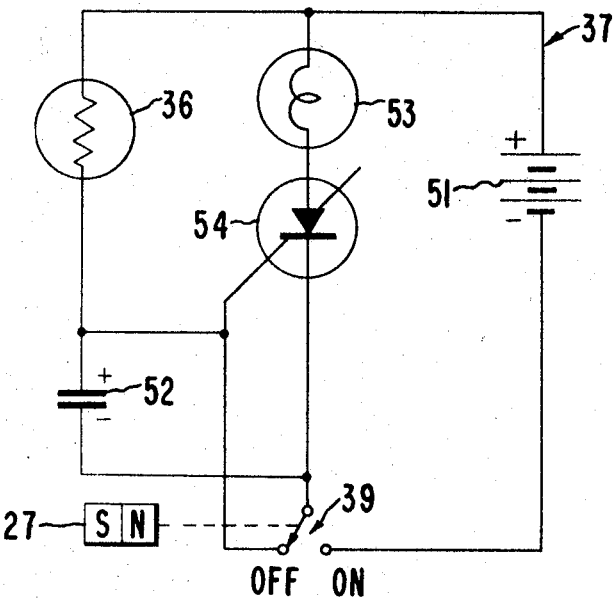
FIG. 8 is a schematic circuit diagram illustrating another timing circuit that can be utilized with the present invention.

The timing platen 32, which is particularly well suited for use with transilluminated photonegative sheet material 33 for subsequent production of an image on a photopositive sheet material (not shown), includes a transparent plate 34 such as, for example, Plexiglas, the upper surface of which is treated such as with transversely extending scorelines 35 for enhancing the amount of internal reflections therein from ambient illumination directed thereonto. A photoresistor 36 connected to a miniature timing circuit 37 housed in an end segment of the platen 32 and to be described in greater detail below with reference to FIG. 8 is positioned within one end of plate 34 for receiving light via internal reflections within plate 34. The light received by the photoresistor is proportional to the ambient illumination passing through the lower surface of platen 32 to the photocopy paper 33. In this specific example the photoresistor 36 is selected so that the light received by photoresistor 36 inversely determines its resistance for providing a reading, in the form of an electrical analog, of the ambient illumination directed onto the transilluminated photonegative 33 positioned below the plate 34 on top of the sheet 31. Thus, a high level of ambient illumination produces a low resistance in the photoresistor 36, while a low level of ambient illumination produces a high resistance.

An opaque flap 38 such as, for example, of black felt, is removably positioned on the top surface of plate 34 such as by being secured with an adhesive to the end of the plate 34 opposite the end at which the photoresistor 36 is located. This flap 38 serves to shield the photosensitive paper located beneath the plate 34 until it is desired to initiate the exposure. To initiate the timing cycle measured by timing circuit 37 as described below, the flap 38 cooperates with a switch 39 in the timing circuit 37 to turn on the timing circuit when the flap 38 is removed from the top surface of plate 34. The particular switch connection provided is a small bar magnet 41 secured to the flap 38 and located over a magnetically operated reed switch 39 such as, for example, a magnetically operated single pole double throw switch connected in the timing circuit 37.

The timing circuit 37 which is illustrated in FIG. 8 includes a power source such as a battery 51 connected through the photoresistor 36, a charging capacitor 52 and the switch 39 back to the battery 51. Shunted across the photoresistor 36 and the charging capacitor 52 is an indicating lamp 53 which is exposed to the view of the operator and which is in series with a silicon controlled switch 54 for turning on the indicating lamp 53 when the charging capacitor has charged to a particular switching voltage. The off position of switch 39 breaks the connection to the battery 51 and shorts the capacitor 52 so that the capacitor is at zero voltage when a timing cycle is initiated by removal of the flap 38 to move the magnet 41 away from switch 39.

The portable copying device is operated by the procedure described below. First, a photonegative sheet 33 is removed from a light tight compartment (not shown) and placed with its photosensitive surface directed down on top of the sheet 31 containing the graphic information to be copied. The timing platen 32 with the opaque flap 38 covering the top surface and the bar magnet 41 in position over switch 39 is placed with its bottom surface on top of the photonegative sheet 33. The free end of the opaque flap 38 is then removed from the plate 34, and in the process when the magnet 41 is removed from the switch 39 the timing circuit 37 is closed so that the discharging capacitor 52 charges up in proportion to the light internally reflected within plate 34 and incident on the photoresistor 36 over the time interval beginning from removal of the flap 38. The grooves 35 in the upper surface of plate 34 enhance light reflections internally of the plate 34 in variable accordance with the amount of ambient illumination incident upon and transmitted through the bottom surface of plate 34 to the transilluminated photonegative sheet 33. When the battery power is switched on, the capacitor 52 charges exponentially toward the battery voltage at a rate determined by the values of the photoresistor 36 and the charging capacitor 52. This rate of charge is determined directly by the amount of light reaching the photoresistor 36. When the charge on the capacitor 52 has reached a preselected desired voltage corresponding to the desired amount of integrated light incident on the transilluminated photonegative, switch 54 operates to turn on the indicating lamp 53 to show that the desired exposure time has elapsed so that a photopositive copy can be made from the photonegative sheet. Instead of separately placing the platen 32 and photonegative sheet 33 on the sheet 31, this placement can be accomplished all in one step if desired.

While it is believed that sufficient information has been given by way of example above for construction of a practical embodiment of this invention, in the following table specific designation of operable elements for a timing circuit of FIG. 8 for utilization with the present invention is given.

TABLE

| Reference No. | Element | Description |
| --- | --- | --- |
| 23 | Photoresistor | ORP60 |
| 27 | Magnet | H-33 |
| 28 | Switch | Hamlin DRG-DTH |
| 51 | Battery (2) | 1½ v., RCA VS036 |
| 52 | Charging capacitor | 100µf., 6v. |
| 53 | Lamp | No. 48 bulb |
| 54 | Switch | GE type 3N84 |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A portable photocopying machine for producing copies of graphical material on transilluminated photosensitive copy paper utilizing ambient light to sensitize the copy paper comprising, in combination: a casing having a copying platform adapted to be positioned for receiving ambient light substantially uniformly thereacross and for supporting a member having graphical material printed thereon to be subjected to the incident light; and a light-integrating timer means mounted in said casing for integrating the amount of light incident on said copying platform to determine the exposure time of the copy paper in the incident ambient light, said timer means including a battery, a light-sensitive resistor mounted on said platform adjacent said copy paper and connected in series with said battery and exposed to the ambient light incident on said copying platform, an ignitable lamp mounted on said platform and exposed to the view of the operator, a charging capacitor connected across said ignitable lamp, and switch means for connecting said lamp and said capacitor in series circuit with said battery and said resistor for charging the capacitor and igniting the lamp in a time interval dependent upon the amount of ambient light incident upon said copying platform during an extended period of time.

2. In a portable copying machine for producing copies of graphic information from a sheet of material, a timing platen including a transparent plate of a size and configuration suitable for producing internal reflections of light directed thereonto with the amount of light internally reflected within the plate being proportional to the amount of light transmitted through said plate, a photosensitive element secured to said plate and arranged to detect said internally reflected light, means connected to said photosensitive element for effectively integrating an analog corresponding to said proportional amount of internally reflected light received by said photosensitive element to determine the desired exposure for graphic information on said sheet of material positioned to receive light transmitted through said transparent plate, an opaque flap, means for securing a portion of said flap to said plate so that the flap can be removably positioned on a broad surface of the plate, switch means mounted to said plate for operating an exposure timing cycle and means secured to said opaque flap for cooperation with said switch means for activating said switch means upon removal of said opaque flap from the surface of said plate.

3. In a portable copying machine for producing copies of graphical material in accordance with claim 2 in which said switching means includes a magnetically operable switch and said means mounted to said flap includes a magnet for operating said magnetically operable switch.

4. A portable photocopying apparatus for producing a graphical image by exposing transilluminated copy paper to ambient light, comprising: a substantially rigid member having a surface of a size at least coextensive with the copy paper and a light integrating circuit connected to said member for integrating an analog of the amount of ambient light incident on said copy paper until a desired amount of light necessary to produce the proper exposure of the copy paper has been received by said copy paper, said circuit including a battery, a light-sensitive resistor connected to said battery, a lamp, a charging capacitor connected across said lamp, and switch means having a first position for connecting said resistor and said capacitor in series circuit with said battery, and a second position for disconnecting said lamp and said capacitor from said battery and for shunting said capacitor, whereby when said switch means is in said first position, application of said desired amount of ambient light to said resistor will provide a voltage sufficient to charge said capacitor and fire said lamp.

5. In a portable photocopying apparatus for producing a graphical image by exposing transilluminated copy paper to ambient light, said apparatus including a substantially rigid member having a surface of a size at least coextensive with the copy paper, the improvement comprising: a light integrating circuit for monitoring the ambient light incident on said copy paper to determine when said copy paper has been exposed to a desired amount of ambient light, said circuit including a photosensitive element secured to the rigid member in a position out of the direct exposure area of the copy paper positioned for receiving ambient light correlated to the ambient light incident on said copy paper and providing an electrical analog proportional to the amount of ambient light incident on said copy paper, said photosensitive element positioned to be substantially unaffected by light transmitted through said copy paper, said circuit further including means responsive to said photosensitive element for providing a signal when said copy paper has been exposed to said desired amount of ambient light.

6. The portable photocopying apparatus in accordance with claim 5 including a casing having a copying platform serving as the surface of said substantially rigid member and with said photosensitive element mounted on said platform adjacent the exposure area of said copy paper.

7. In a portable photocopying apparatus for producing a graphical image by exposing transilluminated copy paper to ambient light, said apparatus including a substantially rigid member having a surface of a size at least coextensive with the copy paper, the improvement comprising: a light integrating circuit for monitoring the ambient light incident on said copy paper to determine when said copy paper has been exposed to a desired amount of ambient light, said circuit including a photosensitive element positioned for receiving ambient light correlated to the ambient light incident on said copy paper and providing an electrical analog proportional to the amount of ambient light incident on said copy paper, said photosensitive element positioned to be substantially unaffected by light transmitted through said copy paper, said circuit further including means responsive to said photosensitive element for providing a signal when said copy paper has been exposed to said desired amount of ambient light, said substantially rigid member being a transparent plate suitable for producing internal reflections of the light of the light directed thereonto with the amount of light internally reflected within the plate being proportional to the amount of light transmitted through the plate.

8. In a portable photocopying apparatus for producing a graphical image by exposing transilluminated copy paper to ambient light, said apparatus including a substantially rigid member having a surface of a size at least coextensive with the copy paper, the improvement comprising: a light integrating circuit for monitoring the ambient light incident on said copy paper to determine when said copy paper has been exposed to a desired amount of ambient light, said circuit including a photosensitive element positioned for receiving ambient light correlated to the ambent light incident on said copy paper and providing an electrical analog proportional to the amount of ambient light incident on said copy paper, said photosensitive element positioned to be substantially unaffected by light transmitted through said copy paper, said circuit further including means responsive to said photosensitive element for providing a signal when said copy paper has been exposed to said desired amount of ambient light, said photosensitive element being a light-sensitive resistor and said signal means being a lamp, said circuit further including a battery connected to said resistor, a charging capacitor connected across said lamp, and switch means having a first position for connecting said resistor in said capacitor in series with said battery, and a second position for disconnecting said lamp in said capacitor from said battery and for shunting said capacitor, whereby when said switch means is connected in series with said resistor and said capacitor, voltage sufficient to charge said capacitor and fire said lamp will be an electrical analog of the amount of ambient light desired for exposure of said copy paper.

References Cited

UNITED STATES PATENTS

| | | | |
|---|---|---|---|
| 3,020,801 | 2/1962 | Lander et al. | 88—24 |
| 3,147,684 | 9/1964 | Gold et al. | 95—75 |
| 3,224,352 | 12/1965 | Valette et al. | 95—77 X |
| 3,074,312 | 1/1963 | Olson | 88—24 |
| 3,102,463 | 9/1963 | Biedermann | 88—24 |

NORTON ANSHER, *Primary Examiner.*

MONROE H. HAYES, *Assistant Examiner.*